United States Patent [19]

Wagner

[11] 4,072,480
[45] Feb. 7, 1978

[54] DUAL IMPREGNATED ACTIVATED CARBON FOR IMPROVED REMOVAL OF MALODOROUS SULFUR COMPOUNDS

[75] Inventor: Norman J. Wagner, Pittsburgh, Pa.

[73] Assignee: Calgon Corporation, Pittsburgh, Pa.

[21] Appl. No.: 757,729

[22] Filed: Jan. 7, 1977

[51] Int. Cl.$^2$ ............................................. B01D 53/04
[52] U.S. Cl. ........................................ 55/73; 55/74; 55/387
[58] Field of Search ............. 55/73, 74, 387, DIG. 30; 252/411 R, 411 S, 420; 423/224, 230

[56] References Cited

U.S. PATENT DOCUMENTS

| | | | |
|---|---|---|---|
| 3,391,988 | 7/1968 | Friess | 55/73 X |
| 3,416,293 | 12/1968 | Alexander | 55/73 |
| 3,578,390 | 5/1971 | Kruel et al. | 55/73 X |
| 3,598,521 | 8/1971 | Alley | 55/73 X |
| 3,696,629 | 10/1972 | Heston, Jr. | 55/73 X |
| 3,736,726 | 6/1973 | Grimm et al. | 55/73 |

*Primary Examiner*—Thomas G. Wyse
*Assistant Examiner*—Robert H. Spitzer
*Attorney, Agent, or Firm*—Raymond M. Speer

[57] ABSTRACT

An improved process for the removal of malodorous sulfur compounds, for example $H_2S$ and methyl mercaptan, from gas streams containing oxygen in which a bed of activated carbon treated with PbOAc, NaOH and moisture is used to remove said compounds. The treatment, which may also be combined with regeneration of the activated carbon, is effected, typically, by applying to the carbon one bed volume of dilute (4–6%) NaOH and PbOAc solution, draining and drying with 50–100% R.H. air.

7 Claims, No Drawings

DUAL IMPREGNATED ACTIVATED CARBON FOR IMPROVED REMOVAL OF MALODOROUS SULFUR COMPOUNDS

BACKGROUND OF THE INVENTION

The present invention is concerned with an improved method and product for the removal of sulfur-containing compounds having disagreeable odors, from gas streams containing oxygen, most often, air. The improvement comprises use of a suitable activated carbon impregnated with NaOH, lead acetate (hereinafter PbOAc), and moisture.

Copending application Ser. No. 752,498, the subject matter of which is incorporated herein by reference, discloses improved removal of malodorous compounds using activated carbon impregnated with NaOH and moisture.

The malodorous sulfur-containing compounds whose removal is enhanced by use of the method and product of the present invention include, principally, hydrogen sulfide, and mercaptans, especially methyl mercaptan.

Malodorous sulfur-containing compounds occur in a number of environments, where they are primarily responsible for the presence of disagreeable odors. Such environments include petroleum storage areas, sewage treatment facilities, and pulp and paper production sites, among others. These odor-causing compounds may be bacterial breakdown products of higher organic compounds.

Hydrogen sulfide, $H_2S$, is a colorless, denser than air, gas with a characteristic odor of rotten eggs. The gas is produced in coal pits, gas wells, sulfur springs, and from decaying organic matter containing sulfur. Control of emissions of this gas, particularly from municipal sewage treatment plants, has long been considered desirable. In fact, in addition to its unpleasant odor, hydrogen sulfide is not only flammable, but with respect to its human toxicity, it is regarded as an extremely hazardous substance. Consequently, ways of controlling hydrogen sulfide emissions have long been sought in a number of areas, including, among others, crude oil storage, petrochemical refining, and papermaking.

Mercaptans, also referred to as thio alcohols or thiols, may be represented by the formula R-S-H, where R represents an alkyl group of from one to eight carbon atoms. The obnoxious odor of mercaptans decreases with increasing molecular weight, and is not present where R is alkyl of nine or more carbon atoms. While only methyl and ethyl mercaptan of the said mercaptans are in the form of a gas at normally encountered ambient temperatures, the mercaptans are volatile and even extremely small concentrations are detectable by humans. Consequently, mercaptans of up to eight carbon atoms are included within the scope of the present invention. Nevertheless, the present invention is particularly useful for removal of methyl mercaptan.

Activated carbon will physically adsorb considerable quantities of hydrogen sulfide. See, for example, U.S. Pat. No. 2,967,587. See also French Pat. No. 1,443,080, which describes adsorption of hydrogen sulfide directly by activated carbon, which is then regenerated by hot inert gas or superheated steam. However, it has long been recognized that much better removal can be accomplished by employing the carbon to, in effect, catalyze the oxidation of hydrogen sulfide to sulfur, based on the ability of carbon to oxidize hydrogen sulfide to elemental sulfur in the presence of oxygen. For example, a conventional process employs small amounts of ammonia added to the influent gas stream containing hydrogen sulfide and oxygen to further catalyze the reaction, and capacities as high as 100 percent by weight of the carbon have been reported.

Other catalytic agents to be impregnated on activated carbon for the removal of hydrogen sulfide have been suggested. See, for example, French Patent No. 1,388,453 which describes activated carbon granules impregnated with 1% iodine ($I_2$) for this use. South African Patent No. 70/4611 discloses the use of silicate-impregnated activated carbon. Swinarski et al., *Chem. Stosowana,* Ser. A 9(3), 287–94 (1965), (*Chemical Abstracts,* Vol. 64, 1379c), describe the use of activated carbon treated with potassium salts, including KOH, for hydrogen sulfide adsorption.

A problem faced in the prior art in using activated carbon for hydrogen sulfide removal has been the reduction in net adsorption capacity of the activated carbon with increasing number of adsorption cycles. That is, the activated carbon experiences an increase in the amount of residual compositions, possibly sulfur, which, in turn, results in a continuing reduction in the total adsorption capacity of the activated carbon through successive adsorption cycles. South African Patent No. 70/4611, referred to above, teaches overcoming this problem with the use of silicate-impregnated activated carbon, but also teaches that extraction with alkaline solutions is ineffective to remove such residual adsorbate. Boki, in *Shikoku Igaku Zasshi,* 30 (3), 121–8 (1974) (*Chemical Abstracts,* Vol. 81, 126300p), discloses that the adsorption capacity of activated carbons used for adsorption removal of hydrogen sulfide gas can be recovered to nearly original levels by treatment with 1% NaOH. However, it is clear that these are simply attempts in the prior art to overcome the problem of decreasing net adsorption. Thus, the prior art has failed to appreciate the discovery of the present invention, that proper treatment of activated carbon with NaOH, PbOAc and moisture can result in an activated carbon whose capacity for malodorous sulfur-containing compound removal is increased several fold, not merely restored to unused (virgin) activated carbon capacity. In accordance with the present invention, the character of the adsorption by the activated carbon is apparently changed from predominantly physical adsorption to predominantly chemical reaction followed by physical adsorption.

The overall reaction in which hydrogen sulfide is oxidized to elemental sulfur in the presence of activated carbon may be represented by the following equation:

$$2H_2S + O_2 \rightarrow 2H_2O + 2S \qquad (1)$$

However, it has been demonstrated that two other reactions can occur:

$$2H_2S + 3O_2 \rightarrow 2SO_2 + 2H_2O \qquad (2)$$

and $$2SO_2 + 4H_2S \rightarrow 6S + 4H_2O \qquad (3)$$

It has been demonstrated that the reaction (2) above is accelerated by the presence of moisture on the activated carbon. See Swinarski, A., and Siedlewski, J. Roczniki Chemii, 35, pp. 999–1008 (1961) and U.S. Pat. Nos. 3,598,521 and 3,416,293. It is also known that preoxidation of the carbon surface increases total hydrogen sulfide removal capacity, but at the same time also increases the proportion of sulfur oxides formed. Thus, during hydrogen sulfide removal by activated carbon, a number of potential reaction products are possible, although the primary reaction product is elemental sulfur.

Various methods are known in the art for removing malodorous sulfur compounds from gas streams using impregnated activated carbons. For example, see Japanese Patent Application No. 39-23720 where carbonate of hydroxide of potassium or sodium is used to impregnate the activated carbon. U.S. Pat. No. 3,391,988 discloses a method for removal of mercaptans from exhaust gas by contact with an adsorbent impregnated with a liquid mixture of an alkaline material.

The present invention is also indirectly concerned with the use of NaOH to regenerate activated carbon which has become loaded with, i.e., reached its efficient removal capacity for malodorous sulfur-containing compounds. The regeneration with NaOH restores the major part of the original adsorptive capacity of the spent activated carbon. However, the present invention employs such regeneration as a convenient method of removing adsorbate while at the same time providing a ready means of impregnation of the activated carbon with NaOH for improved adsorptive capacity for malodorous compounds, as described hereinafter. Thus, other regeneration techniques, known in the art, might be employed, followed by NaOH, PbOAc and moisture impregnation. Such conventional regeneration techniques, useful in restoring virgin capacity prior to impregnation with NaOH, PbOAc and moisture, include thermal treatment and wet air oxidation, among others.

It is well known that activated carbons used for removal of hydrogen sulfide can be regenerated for re-use by removing the adsorbed sulfur compounds, a large portion of which will be elemental sulfur when oxidizing conditions exist during the absorption. The compounds can be removed by extracting them with a suitable organic solvent. Such materials as ammonium sulfide, carbon disulfide, xylene and toluene have proven effective regenerating media. Regeneration using ammonium sulfide as the solvent has been common. Sulfur is recovered from the solvent by distilling off the ammonium polysulfide or by steaming the solvent. Regeneration has also been accomplished using hot inert gas, superheated steam and natural gas under high pressure.

Regeneration methods heretofore employed in the art for restoring activated carbons used to remove hydrogen sulfide suffer from a number of disadvantages. The use of organic solvents is undesirable from the standpoint of environmental pollution as well as of personnel safety, and will usually entail expensive recovery systems. Regeneration by hot gases or steam requires the expenditure of considerable amounts of energy, a clear disadvantage. A more serious detriment, perhaps, than those just discussed, is that detriment inherent in most prior art activated carbons used for hydrogen sulfide removal and processes for their regeneration, which is the decrease in net adsorption capacity experienced through successive adsorption cycles. The disadvantages of these prior art activated carbons and regeneration processes as been overcome in the treatment method and resultant activated carbon of the present invention.

SUMMARY OF THE INVENTION

In accordance with the present invention, activated carbon is treated with NaOH, PbOAc and moisture, and the thus-treated activated carbon is then employed for enhanced removal of malodorous sulfur-containing compounds from gas streams, under oxidizing conditions. The activated carbon is impregnated with NaOH, PbOAc and moisture sufficient to impart an enhanced adsorptive capacity for said compounds, over the adsorptive capacity of virgin, i.e., unimpregnated activated carbon.

The PbOAc impregnating composition employed in the present invention is a naturally hydrated salt in the form of colorless crystals or white granules, having the following formula: $Pb(C_2H_3O_2)_2.3H_2O$. The anhydrous salt may also be employed. The treatment method of the present invention may be employed with or result from an associated regeneration method. The treatment method is performed upon virgin activated carbon, impregnating it with NaOH, PbOAc and moisture, while the regeneration method is performed upon loaded activated carbon under conditions resulting in impregnation of the activated carbon with moisture and NaOH, followed by impregnation with PbOAc. It will be understood that the present invention includes malodorous sulfur-containing compound removal methods where virgin activated carbon is employed initially and the loaded activated carbon resulting from removal of the said compounds is regenerated and subsequently subjected to the treatment method of the present invention. However, it is preferred to employ initially an activated carbon which has been subjected to the treatment with NaOH, PbOAc and moisture, since the adsorption capacity of the activated carbon for malodorous compounds is thereby greatly increased.

The treated activated carbons of the present invention are employed to remove malodorous sulfur compounds by adsorption from ambient gas streams under oxidizing conditions. The concentration of said malodorous compounds in the gas stream is not considered critical, and concentrations resulting in as low an amount as $1.0 \times 10^{-6}$ mole of the compounds passing through the activated carbon per minute can be removed by adsorption. The general effectiveness of the treated activated carbons of the present invention in removing, in particular, $H_2S$ by adsorption, has been determined by establishing the time required to arrive at a breakthrough concentration of from 1 to 50 parts per million (p.p.m) by volume of $H_2S$ in the gas passing out of the activated carbon. The concentration levels have been measured using Mine Safety Appliance Company (MSA) detector tubes sensitive in the 1 to 50 p.p.m. range. For methyl mercaptan, loading capacity as percent by weight of adsorbate based on weight of activated carbon, for various breakthrough levels, has been determined to establish the effectiveness of the treated activated carbons of the present invention. Enhanced removal capacity is shown by comparative determinations using virgin activated carbon.

The physical and chemical makeup of the gas stream from which it is desired to remove malodorous sulfur compounds is not critical, provided that oxidizing conditions prevail. Typically, the malodorous compounds will be removed from air, especially from air admixed with effluent gas streams resulting from municipal waste treatment facilities, petrochemical refining plants, and so forth. The oxidizing conditions required are generally that oxygen at least be present in the gas stream being treated. This may be in very small amounts, but usually will be in an amount of at least 5 percent by volume, preferably 10 percent by volume, and most preferably at least 15 percent by volume. The required oxygen content is derived most readily from air, if air comprises a sufficient portion of the gas stream being treated to provide the necessary amount of oxygen. The oxygen may, of course, be independently introduced into the gas stream being treated, if oxygen is totally absent therefrom or present only in insufficient amounts. As will be appreciated, the amount of oxygen required for maximum malodorous compound adsorption in accordance with the present invention will depend on a number of factors, including the concentration and absolute amount of any one or more of the malodorous compounds being adsorbed from the gas stream being treated.

As is recognized, the amount of malodorous sulfur compound adsorbed by any particular activated carbon will be a function of at least the following factors: basic degree of attraction of the activated carbon for the particular malodorous compound; the pore structure of the activated carbon, particularly with respect to size; the specific surface area of the activated carbon; and the surface characteristics of the activated carbon. Selection of a suitable activated carbon starting material for use in the treatment method of the present invention will largely be within the ordinary skill of the artisan. For example, it will be preferred to employ an activated carbon whose pores have diameters falling, for the most part, in the range of from about 10 to about 80 A. It has been found particularly important to employ activated carbons having high surface areas. Thus it is preferred to use BPL granular activated carbon for vapor phase applications, manufactured by the Pittsburgh Activated Carbon Company, Pittsburgh, Pennsylvania. Granular activated carbon is preferred to powder, and the size range of the granules is largely a matter of choice, although granules falling between Nos. 4 and 10 of the U.S. Sieve Series are preferred. It has also been found that flow rates of the gas stream being treated through the bed of activated carbon especially affect the breakthrough capacities of the activated carbon.

The impregnation treatment of the activated carbon starting material in accordance with the present invention has not been found to be critical with respect to the particular sequence in which the activated carbon is impregnated with NaOH, PbOAc and moisture. In fact, the NaOH and PbOAc impregnating compositions may be employed together in treating the activated carbon starting material, by forming an aqueous solution of the desired amounts of each together, applying the aqueous solution to the activated carbon, and then drying the thus-impregnated activated carbon with warm air of high relative humidity until the desired moisture content is obtained.

The NaOH treatment of the activated carbon starting material may be carried out in any manner which effectively impregnates the activated carbon with from about 0.5 percent to about 20 percent by weight of NaOH, based on weight of dry activated carbon. The preferred amount of NaOH impregnated is from about 1.0 to about 15 percent by weight, while the most preferred amount of NaOH impregnated is from about 5 to about 10 percent by weight of the activated carbon. The NaOH treatment may be carried out simply by soaking the virgin or loaded activated carbon, or activated carbon already impregnated with PbOAc, in one bed volume of NaOH solution of from about 5 to about 60% by weight concentration. The time required to produce the required impregnation levels as described above is dependent approximately on the concentration of the NaOH solution employed, and will only be as much time as is needed for the NaOH solution to penetrate the activated carbon. For example, it has been found that the BPL activated carbon is effectively impregnated in accordance with the present invention when it is soaked in one bed volume of 4.8 percent by weight NaOH for only a few minutes. It will be understood that using NaOH for regeneration alone, as opposed to impregnation, requires substantially longer periods of time. These times will also tend to be dependent upon the concentration of the NaOH solution employed. Other methods of impregnating the activated carbon starting material would suggest themselves as equally appropriate, and these are included within the scope of the present invention. For example, the NaOH solution may be passed through the activated carbon rather than being used in a static immersion treatment. However, it has been found that a preferred method of NaOH impregnation is by spray-addition in which a NaOH solution is sprayed onto the granular activated carbon being tumbled in a mixer. This method of impregnation will be described in more particular detail hereinafter.

The PbOAc treatment of the activated carbon starting material may be carried out in any manner which effectively impregnates the activated carbon with from about 0.1 percent to about 5 percent by weight of PbOAc, based on weight of dry activated carbon. The preferred amount of PbOAc impregnated is from about 0.3 to about 3 percent by weight, while the most preferred amount of PbOAc impregnated is from about 0.5 to about 2 percent by weight of the activated carbon. As with the NaOH treatment, the PbOAc treatment may be carried out simply by soaking the virgin activated carbon, or activated carbon already impregnated with NaOH, in one bed volume of PbOAc solution of from about 0.1 to about 10 percent by weight concentration. The time required to produce the required impregnation levels is the PbOAc solution employed, and will only be as much time as is needed for the PbOAc solution to penetrate the activated carbon. Other methods of impregnating the activated carbon starting material would suggest themselves as equally effective, and these are included within the scope of the present invention. For example, it has been found that a preferred method of PbOAc impregnation is by spray-addition in which a PbOAc solution is sprayed onto the granular activated carbon being tumbled in a mixer.

While the NaOH regeneration of the loaded activated carbon described above restores the activated carbon essentially to its absorption capacity as virgin activated carbon, it has been discovered that the presence of moisture in the activated carbon, in association with the impregnated NaOH, and additionally PbOAc, results in an activated carbon whose adsorption capacity for malodorous sulfur compounds is increased as much as ten fold over the adsorption capacity of virgin activated carbon for said malodorous compounds. While the presence of moisture in virgin activated carbon effects a substantial increase in the total malodorous compound adsorption capacity of the activated carbon, as compared to dry, that is, moisture-free virgin activated carbon, the overall effect produced by combining NaOH, PbOAc and moisture in treatment of activated carbon, is a synergistic one.

The term "moisture" is intended to define essentially pure water, and with reference to treatment of activated carbon and its presence therein, it is intended to define water present within the activated carbon structure, being held therein mechanically or by physical or chemical adsorption, or by any combination of these.

The amount of moisture present in the activated carbon which will be sufficient to produce the maximum increase in malodorous sulfur compound adsorption capacity of the activated carbon, in accordance with the present invention, whether the activated carbon is a virgin carbon being treated initially, or a loaded carbon being regenerated and impregnated, will depend on several factors, related primarily to the characteristics of the activated carbon being treated or regenerated. Moreover, the presence of moisture in the NaOH- and PbOAc-impregnated activated carbon appears to further increase the malodorous sulfur compound adsorption capacity of the activated carbon in even small amounts of a few percent or less, by weight. Generally, the amount of moisture desirably present in the NaOH- and PbOAc-impregnated carbon is from about 4 to about 50 percent by weight of the activated carbon, preferably from about 6 to about 45 percent, and most preferably from about 10 to about 40 percent by weight.

The desired moisture content of the activated carbon in accordance with this invention, is readily obtained by employing moist air during the drying step following NaOH and PbOAc impregnation. Drying with air having a relative humidity of from about 40 to about 60 percent has been found sufficient to introduce the desired amount of moisture. Relative humidity lower than this, or up to somewhat less than 100 percent may be employed. However, moisture should not be introduced to the extent that the carbon is soaked to the point of wetness thereby. Other methods of introducing the desired amount of moisture will readily suggest themselves to one of ordinary skill in this art, and all such methods are intended to be included within the scope of this invention.

The NaOH, PbOAc and moisture impregnated activated carbons of the present invention possess advantages over ordinary activated carbons in addition to enhanced adsorptive capacity for malodorous sulfur compounds. For example, the NaOH and PbOAc impregnated activated carbon has a demonstrated slimicidal property which can prevent the accumulation of slime on the activated carbon, thus preventing interference by the slime with its functioning through blocking of the activated carbon pores. And the NaOH, PbOAc and moisture impregnated activated carbons of the present invention do not require water scrubbing prior to use in odor control applications, which is sometimes the case for ordinary activated carbons preparatory to such use.

The NaOH, PbOAc and moisture impregnated activated carbons of the present invention may, of course, be employed alone in beds for the removal of malodorous sulfur compounds. However, they may be advantageously employed together with beds containing other activated carbons, including ordinary virgin activated carbon, as well as activated carbons impregnated with various catalytic materials. Various combinations of bed arrangements may be employed. Thus, for example, a bed of ordinary virgin activated carbon may be employed together with a bed of the NaOH, PbOAc and moisture impregnated activated carbon of the present invention, either upstream (i.e., before the bed of NaOH, PbOAc and moisture impregnated activated carbon with respect to the effluent gas being treated) or downstream thereof.

The following examples will serve to better illustrate the treatment methods of the present invention and the dramatic increase in malodorous sulfur compound adsorption capacity produced thereby.

EXAMPLE 1

A study was carried out to evaluate the removal efficiency of NaOH, PbOAc and moisture impregnated activated carbon for methyl mercaptan in a gas stream. The performance of this dual impregnated activated carbon was also indirectly compared to that of a NaOH and moisture impregnated activated carbon, as well as that of an unimpregnated virgin activated carbon, by evaluating the performance of the NaOH and moisture impregnated carbon, and of the unimpregnated virgin activated carbon together in a separate test run under the same conditions.

The dual impregnated activated carbon was prepared by dissolving 1 g. of PbOAc and 5 g. of NaOH in 90 g. of water and adding the resulting solution rapidly with stirring to 100 g. of 4 × 10 BPL activated carbon. The impregnated carbon was then dried at 150° C. in air until the activated carbon contained 10% by weight of moisture. The NaOH and moisture impregnated activated carbon was 4 × 10 BPL activated carbon which contained 5% by weight of NaOH and 8.3% by weight of moisture. The unimpregnated virgin activated carbon was 4 × 10 BPL activated carbon.

The testing was carried out in a continuous flow system in which the test column consisted of a 19 mm. diameter glass column, having a cross-sectional area of 2.83 cm.$^2$ and a total volume of 20.4 cm$^3$. The sample charge column was 10 cm.$^3$, which resulted in a bed height of 72 mm. The sample charge weights were: 4.6 g. for the 4 × 10 BPL, 5.4 g. for the NaOH and moisture impregnated BPL, and 5.8 g. for the NaOH, PbOAc and moisture impregnated BPL. A gas mixture containing 1.3% methyl mercaptan, 10% oxygen and the balance nitrogen was passed downstream through each sample bed at a space velocity of 3000 bed volumes per hour (bvh$^{-1}$), i.e., 500 cm.$^3$/min. The methyl mercaptan content of the inlet and outlet gas streams was measured by gas chromatographic analysis. All samples were tested at ambient temperature and pressure. The results of these evaluations are summarized in the table of values below.

| Unimpregnated Virgin 4 × 10 BPL | |
|---|---|
| Time (Min.) | % Breakthrough |
| 0 | 0 |
| 11 | 1.5 |
| 23 | 8.5 |
| 28 | 20.5 |
| 34.5 | 32.0 |
| 40 | 45.0 |

| 4 × 10 BPL Impregnated with 5% NaOH and 8.3% H$_2$O | |
|---|---|
| Time (Min.) | % Breakthrough |
| 0 | 0 |
| 20 | 0 |
| 35 | 1.5 |
| 52.5 | 5.5 |
| 68 | 7.0 |
| 83 | 17.5 |

| 4 × 10 BPL Impregnated with 5% NaOH, 1% PbOAc and 10% H$_2$O | |
|---|---|
| Time (Min.) | % Breakthrough |
| 0 | 0 |
| 21 | 0.1 |
| 30 | 0.2 |
| 48 | 0.5 |
| 59 | 0.9 |

| -continued | |
|---|---|
| 80 | 2.3 |
| 104 | 10.0 |
| 119 | 8.0 |
| 135 | 13.0 |

EXAMPLE 2

The NaOH, PbOAc and mosture impregnated activated carbon of the present invention was evaluated to determine the effect that other contaminants, normally found in malodorous air, would have on its removal efficiency for methyl mercaptan. To this end, malodorous air was collected at the vacuum filter of a municipal sewage treatment plant in 100 l. Tedlar bags. The malodorous air was split into two streams and passed through two test adsorption columns operated in parallel, at 1060 bvh$^{-1}$(46 cm.$^3$/min.). The adsorption columns had radii of 0.575 cm. and lengths of 2.5 cm., and thus a total bed volume of 2.60 cm.$^3$. The tests were run at ambient temperature and pressure. The methyl mercaptan content of the air before and after passing through the adsorption columns was analyzed as a function of time using gas chromatographic analysis. $H_2S$ levels in the air were measured using MSA detector tubes sensitive in the 1-50 p.p.m. range. The inlet air was found to have and $H_2S$ concentration in the range of 5-6 p.p.m., a methyl mercaptan concentration of 4.3 p.p.m., and a considerable number of other malodorous organics totaling 0.64 p.p.m. The results of these evaluations are summarized in the following table of values.

| 4 × 10 BPL Containing 5% NaOH and 10% $H_2O$ | |
|---|---|
| Time (Hrs.) | % Breakthrough |
| 0 | 0 |
| 49 | 0.5 |
| 59.5 | 2.0 |
| 85 | 8.0 |
| 107 | 25.4 |
| 108 | 26.8 |

| 4 × 10 BPL Containing 5% NaOH, 1% PbOAc, and 10% $H_2O$ | |
|---|---|
| Time (Hrs.) | % Breakthrough |
| 0 | 0 |
| 50 | 0.1 |
| 60 | 0.4 |
| 85 | 4.8 |
| 107.5 | 12.2 |
| 109 | 12.9 |

What is claimed is:

1. A process for removal of malodorous sulfur compounds from gas streams containing oxygen, said compounds being one or more members selected from the group consisting of $H_2S$ and mercaptans, which process comprises contacting said gas stream with an activated carbon having impregnated therein from about 0.5 to about 20 percent by weight of NaOH, from about 0.1 to about 5 percent by weight of PbOAc, and from about 4 to about 50 percent by weight of moisture, all based on weight of dry activated carbon.

2. The process of claim 1 wherein the activated carbon has impregnated therein from about 5 to about 10 percent by weight of NaOH, from about 0.5 to about 2 percent by weight of PbOAc, and from about 10 to about 40 percent by weight of moisture, all based on weight of dry activated carbon.

3. The process of claim 1 wherein the malodorous sulfur-containing compound removed in $H_2S$.

4. The process of claim 1 wherein the malodorous sulfur-containing compounds removed are mercaptans.

5. The process of claim 4 wherein the malodorous sulfur-containing compound removed is methyl mercaptan.

6. An activated carbon for removal of malodorous sulfur compounds, characterized by having impregnated therein from about 0.5 to about 20 percent by weight of NaOH, from about 0.1 to about 5 percent by weight of PbOAc, and from about 10 to about 40 percent by weight of moisture all based on weight of dry activated carbon.

7. The activated carbon of claim 6 characterized by having impregnated therein from about 5 to about 10 percent by weight of NaOH, from about 0.5 to about 2 percent by weight of PbOAc, and from about 10 to about 40 percent by weight of moisture, all based on weight of dry activated carbon.

* * * * *